Nov. 5, 1946.  S. WILKINSON ET AL  2,410,697
DIMENSION TESTING GAUGE
Filed May 8, 1943  2 Sheets-Sheet 1
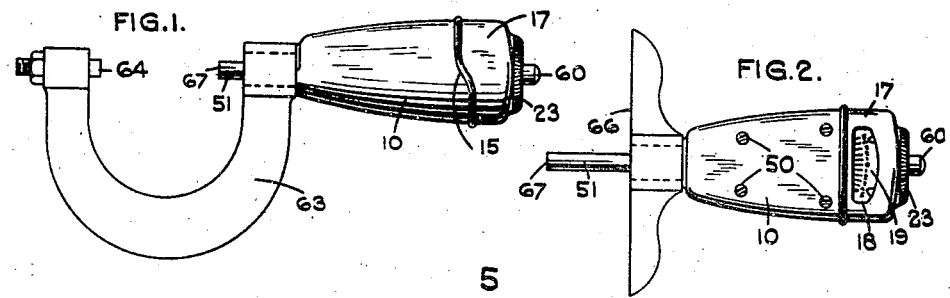
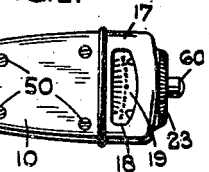
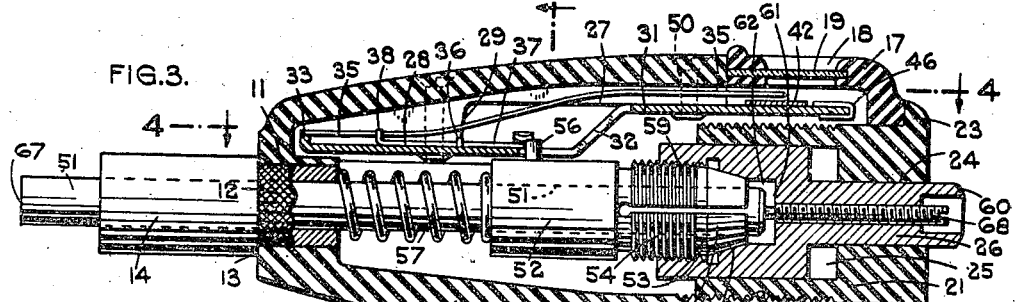
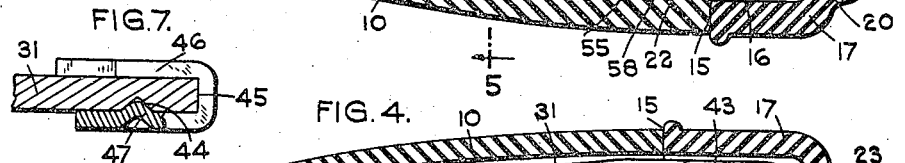
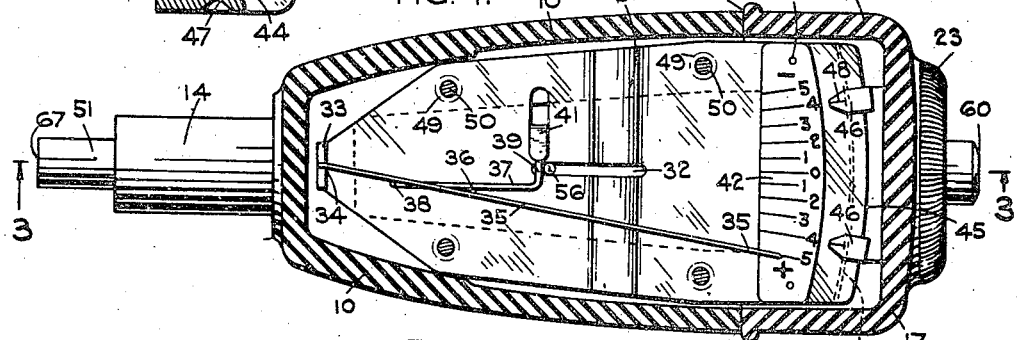
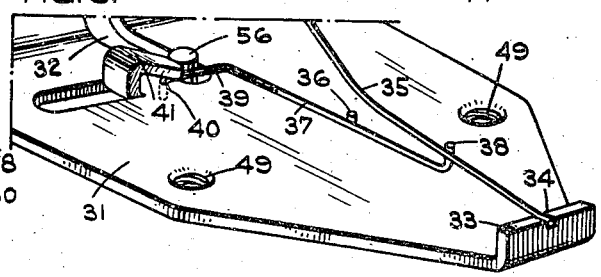
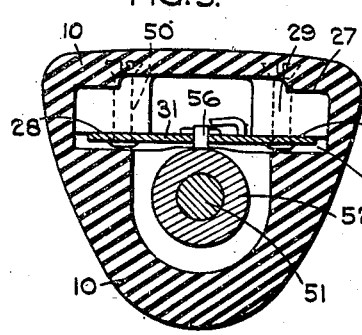
INVENTORS,
Samuel Wilkinson
Arthur Green
BY Harry J. Lucke
ATTORNEY.

Nov. 5, 1946.  S. WILKINSON ET AL  2,410,697

DIMENSION TESTING GAUGE

Filed May 8, 1943  2 Sheets-Sheet 2

INVENTORS.
Samuel Wilkinson
Arthur Green.
BY Henry J. Luche
ATTORNEY.

Patented Nov. 5, 1946

2,410,697

UNITED STATES PATENT OFFICE 2,410,697

DIMENSION TESTING GAUGE

Samuel Wilkinson, Rowley Park, and Arthur Green, Coventry, England

Application May 8, 1943, Serial No. 486,133
In Great Britain May 19, 1942

3 Claims. (Cl. 33—147)

This invention relates to gauges for testing the dimensions of articles. For such purpose micrometer gauges are normally employed, but the latter are subject to the disadvantage that where there is even a relatively small change in dimension quite a substantial movement has to be imparted to the actuating member of the gauge so that the operation of using an ordinary micrometer gauge is somewhat slow.

One of the objects of the present invention is to provide a dimension testing gauge which can be operated more rapidly than the existing ordinary micrometer gauge, and with this object in view according to one aspect of this invention there is provided a dimension testing gauge comprising a pair of relatively movable gauging members for engaging the article whose dimension is to be tested, a movable operating element, means for imparting from the latter to one of said gauging members a motion at least as great as that imparted to the actuating element, means for magnifying said motion, and indicating means for displaying such magnified motion to the operator.

In a more specific form of the above invention the gauge is provided with a pair of indicating elements comprising a scale element and a pointer element co-operating therewith, lever mechanism adapted to transmit relative movement from one of said gauging members to one of said indicating elements, and said lever mechanism being adapted to magnify substantially the movement transmitted, and thereby indicate the same upon the scale.

A further object of the present invention is to provide a gauge, by the use of which the dimensions of parts can be tested at a single operation in such a manner as to reveal whether the dimensions are within certain limits or above or below them.

With this latter object in view, according to another aspect of this invention there is provided a limit gauge comprising a pair of relatively movable gauging members, means for adjusting said members relatively to a given standard gauging distance, indicating means adapted to indicate a given reading when said adjustment to standard distance has been effected, motion magnifying mechanism between said indicating means and one of said relatively movable members, said indicating means in co-operation with said magnifying mechanism being adapted on gauging a distance varying very slightly from the said given standard to display a readily observed indication of such variation.

In a more specific form of this latter aspect of the invention, the gauge comprises a pair of relatively movable gauging members, means for adjusting said members relatively to a given standard gauging distance, indicating means comprising an open scale element and a pointer element co-operating therewith, and adapted to indicate a given reading when such adjustment to standard distance has been effected, motion magnifying mechanism between one of said elements and one of said relatively movable members, said indicating means in co-operation with said magnifying mechanism being adapted on gauging a distance varying very slightly from standard to display on said open scale an indication of such variation, and means adjustable along said scale for indicating the permissible limits of said variation.

The gauge may comprise a body, and one of the movable gauging members conveniently denoted as the primary gauging member, may be constructed in the form of a slide which projects from the body, and the latter may have means for carrying the other or secondary gauging member.

The motion magnifying means may be disposed within the body and comprise primary and secondary levers, the primary lever being adapted for engagement near its pivot by an actuating abutment on the primary gauging member, and this primary lever may engage the secondary lever at a position near its pivot.

Lost motion may be provided between the actuating abutment and the primary lever. A spring may be provided which normally keeps the actuating abutment spaced away from the primary lever and the primary gauging member is operated manually against the pressure of this spring.

The actuating abutment may be adjustably mounted on the primary gauging member.

The actuating abutment may be formed or provided on a collar having a split end which can be contracted on to the primary gauging element by means of a nut combined with a push pin forming an operating element for actuating the gauge.

A plate may be fixed in the body on which the motion magnifying and indicating members are mounted and this plate may be cranked intermediate its ends and slotted longitudinally, the slot extending along the cranked part and the motion magnifying and indicating means may be mounted on one side of the plate while the primary gauging member and consequently the actuating abutment thereon is disposed at the opposite side of the plate, the actuating abutment projecting through the said slot which is disposed in a plane which is inclined or transverse to the plane in which the primary gauging member slides. Consequently if the primary gauging element is moved endwise in one direction the actuating abutment automatically leaves the slot.

The movable gauging element, the actuating abutment and the push pin are preferably withdrawable as a unit from the end of the body.

The body may comprise three parts, a main part of tubular form having an opening at one end adapted to receive a bearing for the primary gauging member and being open at its opposite end which is of stepped formation and contains an internal screw thread, a second part which is formed as a cap adapted to fit against the stepped end of the main member, this cap having a window or opening through which the indicating mechanism can be seen, and a third member consisting of a headed tube which can be inserted in the end of the cap and screwed into the thread in the main member, the head of the tube engaging the end of the cap and the cap having an opening through which the push pin or operating member of the gauge projects.

Another object of this invention is to provide a micrometer gauge which can be read more easily than is the case with existing gauges, and with this object in view our dimension testing gauge as above described may be combined with an ordinary micrometer gauge and serve in place of the ordinary vernier scale on the micrometer gauge.

Referring to the drawings—

Figure 1 is a view in side elevation showing one application of the invention.

Figure 2 is a plan view showing another application of the invention.

Figure 3 is a part section on line 3—3 of Figure 4.

Figure 4 is a sectional plan on line 4—4 of Figure 3.

Figure 5 is a transverse section on line 5—5 of Figure 3.

Figure 6 is a fragmentary perspective view showing a detail of construction.

Figure 7 is a sectional view illustrating a further detail of construction.

Figures 3, 4 and 5 are to a larger scale than Figures 1 and 2, and Figures 6 and 7 are to a larger scale than Figures 3, 4 and 5.

Figure 8:
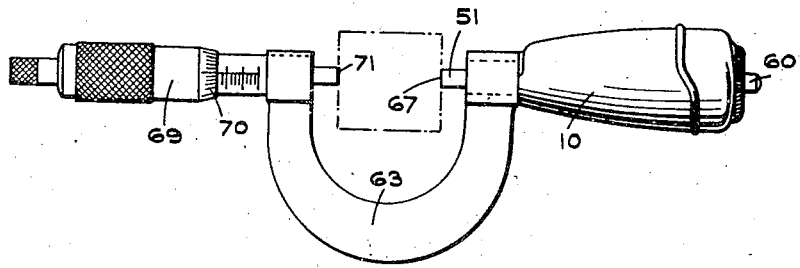
Figure 9:
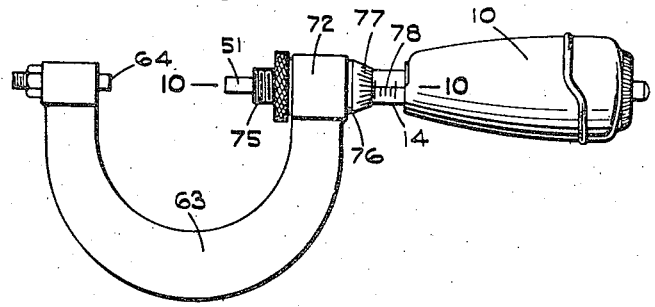

Figures 8 and 9 are views similar to Figure 1 illustrating two modified forms of the invention.

Figure 10:
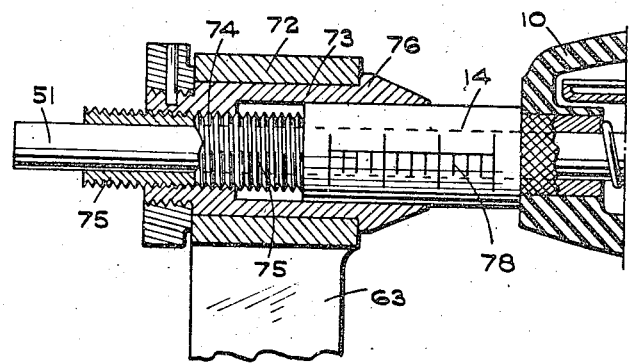

Figure 10 is a detail cross sectional view on the line 10—10 of Figure 9.

In the construction illustrated the gauge comprises a body having a main part 10 of tubular form, one end 11 of which is provided with an opening in which is mounted a metal bearing member 12. This bearing member is shouldered as shown at 13 and has a shank 14 which projects from the end of the body 10.

The opposite end of the body 10 is formed with an inclined step 15 and it is also provided with an internal screw thread 16, the upper side of which is missing, i. e., at this position the body is provided with a part tubular portion forming about three quarters of a cylinder and it is in this part tubular portion that the thread 16 is formed.

The body is provided with a second member 17 which is formed as a cap and has one end adapted to fit closely to the stepped end of the member 10. The cap 17 is provided with an opening 18 at the top of which is fitted a transparent window 19 through which the indicating means in the instrument can be seen.

The end of the cap 17 is provided with an opening 20 through which passes a flanged tubular member 21, the thread 22 of which engages in the thread 16.

The head 23 of the member 21 retains the cap 17 in position.

The tubular member 21 is thus centralised in the body in relation to the bearing 10 and it is provided with a central opening 24 and an internal bore 25 which support and centralise the operating member 26 of the gauge.

The upper part of the inside surface of the member 10 of the body is provided with a facing 27 and near the end 11 with a second facing 28 there being a step 29 between these two facings and as will be seen from Figure 5. Opposite sides of the cavity within the body part 10 are provided with slots 30.

Attached to the facings 27 and 28 is a cranked metal plate 31 having a longitudinal slot 32 which extends along the cranked portion.

At the inner end the plate 31 is bent upwardly as shown at 33 so as to form a lug and a groove 34 is formed in the edge of this lug.

An indicator arm 35 which constitutes a secondary lever has its end fixed in the groove 34, this arm being of spring metal and normally occupying the position shown in Figure 4.

Mounted in the plate 31 is an upwardly projecting stop 36 for a pivoted arm 37 which constitutes a primary lever and has its free end 38 bent upwardly so that it bears against one side of the secondary lever 35.

The primary lever 37 is bent laterally at 39 and downwardly to form a pivot at 40. A lug 41 is formed by partially severing a piece of the plate 31 and bending it upwardly and then to a downward incline as shown clearly in Figure 6, this lug serving to keep the pivot 40 in the hole in place.

Normally the resilience of the secondary lever 35 bears against the part 38 of lever 37 and keeps the two levers in the position shown in Figure 4 with the primary lever 37 bearing against the stop 36.

The free end of the secondary lever 35 moves over a scale 42 marked on a suitable sheet of material and attached to the upper side of the plate 31 by rivets 43.

This scale has its zero mark at the centre and there are further marking on each side of the centre which may each represent one thousandth of an inch or any other pre-selected units. The markings on one side of the zero are further marked + (plus) and the markings on the other side of the zero marked — (minus). Adjacent markings are spaced an appreciable distance apart so that the scale constitutes an open scale, i. e., each marking can readily be observed one from the other and a small movement of the pointer 35 readily noted.

A second scale, similar to that shown in Figure 4, may be provided this second scale being placed alongside the scale 42 with the zeroes coincident. The one scale will be marked "external" and the other "depth" and the + and — signs on the two scales will be reversed in relation to each other.

The underside of the plate 31 (Fig. 7) is provided with a groove 44 concentric with its curved end 45 and two clips 46 embrace the end edge of the plate 31, each of these plates having a portion 47 which enters the groove 44. These clips 46 can thus be slid along the end edge 45 of the plate 31. Each clip is provided with a mark 48 and the clips are adjusted one on each side of the zero mark of the scale 43 to indicate permissible limits of variations from the true size of the article being gauged.

The plate 31 is provided with four plunged holes 49 which are tapped and the plate is held against the facings 27 and 28 by the screws 50.

The free end of the secondary lever 35 forming the indicating arm and the scale 42 and the clips 46 are visible through the window 19.

Slidably mounted in the bearing 12 is the primary movable gauging member or rod 51 and mounted on this member is a collar 52 having a split portion 53 which is screw threaded as shown at 54 and which terminates in a split cone 55.

The collar 52 is provided with an upward projection 56 which operates in the slot 32 and can engage the primary lever 37 near its pivot 40.

The collar 52 is acted upon by a spring 57 operating between one end of the collar and the end of the bearing 12. The collar is fixed to the gauging member 51 frictionally by means of the member 26. The member 26 has a conical portion 58 engaging the split cone 55 and it further has a threaded portion 59 which engages the thread 54.

The member 26 can slide in the bore 25 and it terminates as a push button 60 which projects through the end of the tubular member 21.

It will be observed that by withdrawing the tubular member 21 of the body, the sliding gauging member, its collar 52 and the member 26 can be withdrawn as a unit and the member 26 can be unscrewed to release the split part of the collar of the gauging member 51 to allow the collar to be adjusted along the length of the member 51 and again locked to it by screwing up the member 26, or for inserting a gauging member 51 of different length or one having a differently shaped end.

It will further be observed that the end 61 of the gauging member 51 abuts against an adjusting screw 68 mounted in the push button 60.

The instrument may be used either as an external gauge in which case it may be fitted with a U shaped member 63 as shown in Figure 1 having an adjustable secondary gauging member 64, the U shaped member being mounted on the part 14 of the bearing 12 or the instrument may be used as a depth gauge in which case it may be provided with a flange 65 as shown in Figure 2, the faces 66 of the flange 65 forming the gauging surface. In both cases the movable gauging surface is formed by the end 67 of the gauging member 51.

A series of the gauging member 51 may be provided of different or pre-determined lengths and different shapes at the gauging end.

If the push button 60 is pushed inwardly, the pin 56 acts upon the primary lever 37 very close to its pivot 40 and turns this lever about its pivot. The amount of motion of the pin 56 is thus magnified considerably at the end 38 of the lever 37.

The end 38 of the lever 37 produces a lateral force on the secondary lever 35 and moves its free end across the scale 42. The amount of movement at the free end of the secondary lever 35 is greater than the amount of movement of the end 38 of the primary lever so that the two levers 35 and 37 together constitute a motion magnifying device.

The levers 37 and 35 thus form a device for magnifying the motion of the projection 56. Instead of using two levers for this purpose, a single lever operated by the projection 56 may be used or more than two levers each acting on the next can be used where great accuracy is desired.

In using the instrument as an external gauge, one surface of an article of the correct size is engaged by the gauging member 64 and the push button 60 is operated to bring the end 67 of the primary gauging element into contact with the other surface to be gauged. The pressure on the push button is maintained to keep the end 67 in contact with one side of the article while the gauging element 64 is adjusted until the indicator 35 registers zero.

When subsequent articles are gauged, if they are slightly under-sized, the gauging member 51 moves further than it would have to if the article were of the correct size and consequently the free end of the indicating arm formed by the secondary lever 35 moves beyond the zero mark on the "external" scale. If the article is slightly oversize, the rod 51 will have less movement than for an article of the correct size and consequently the arm 35 will not reach the zero position.

The two marks 48 provide for the operator an indication of the permissible limits of error.

In using the instrument as a depth gauge, an article having a recess which is known to be of true depth is used and the position of the gauging element 51 in the instrument is adjusted by turning the screw 68. Normally pressure on the end of the push button 60 causes this push button, and the member 52 of the gauging element 51 to move endwise as a unit, but the adjustment of the nut on the thread 59 is such that the gauging element 51 can be caused to slide through the collar 52 by operating the screw 68. This effects an adjustment in the distance between the projection 56 and the end 67 of the gauging element 51. An adjustment of this kind is made by operating the screw 68 until when the gauging surfaces 66 and 67 are in contact with the surfaces to be gauged, the position of the projection 56 is such that the free end of the indicating arm 35 is at zero on the "depth" scale.

When gauging subsequent articles, if the depth of the recess is less than it should be, the indicator 35 will not reach the zero mark and will indicate on the minus side of the "depth" scale, and if the recess is deeper than it should be, the arm 35 will pass over the zero mark and will indicate on the plus side of the "depth" scale.

With either embodiment of the invention it will be appreciated that the motion which is transmitted from the push pin 60 to the primary movable gauging member 51 is at least as great as that which is imparted to the push pin unlike the case of the ordinary micrometer where a very substantial movement of the actuating member is necessary to produce a small change in gauging distance.

Furthermore the invention affords a means whereby the dimensions of a series of similar articles can be checked against the standard dimension required for such articles in a very rapid manner and without any subsequent accurate resetting of the gauge being required so that in so using the gauge as a limit gauge for checking variations of dimensions within standard limits the gauge can be used by any unskilled operator without fear of inaccurate workmanship resulting.

The above described embodiments of the invention are all limit gauges and are primarily intended for checking the dimensions of articles against a standard dimension, but the invention is applicable also to micrometer gauges which are not necessarily limit gauges.

One such application of the invention is shown in Figure 8, wherein the secondary gauging member 64 is replaced by an ordinary micrometer gauge of any known construction indicated generally at 69 in Figure 8, but in such construction the usual vernier scale which is provided on known micrometer gauges is omitted and the testing gauge already described and forming the subject of our invention is employed in place of the vernier scale.

For this purpose the scale 42 of the testing gauge is modified so that zero is at one end of the scale instead of in the centre, and the ten divisions on this scale are numbered from the zero end 0 to 10.

The dimensions of the parts of the testing gauge are so chosen in relation to the dimension of the micrometer gauge 69 that a complete movement of the pointer 35 across the scale 42 corresponds to one whole scale division 70 on the micrometer gauge, so that each of the ten divisions on the scale 42 corresponds to one reading of the vernier of the micrometer gauge 69 had the vernier been provided.

In using this form of the invention with the pointer 35 at zero the micrometer gauge 69 would be adjusted to read such whole scale division (indicated at 70) which would permit the article whose dimension was to be tested to just slide freely between the gauging members 67, 71.

This reading of the scale 70 would be noted and the push button is then actuated until the article no longer slides freely between the two gauging members 67, 71 and the reading of the pointer 35 on the scale 42 would then be noted, one division on this scale corresponding to one-tenth of a division on the scale 70.

The actual dimension of the article is thus measured.

By employing in place of the vernier the scale 42 which, as will be understood from the above description, is an open scale, the readings can be noted more easily than would be the case if a vernier were employed.

In the further embodiment of the invention shown in Figures 9 and 10 the gauge there illustrated operates on the same principle as the gauge shown in Figure 8, but the arrangement is more compact and the construction is essentially a modification of that of Figure 1 wherein in order to obtain the requisite ordinary micrometer measuring adjustment a micrometer screw connection is provided between the body 10 and a U shaped member 63, the secondary gauging member 64 of which is provided as in the construction shown in Figure 1.

For this purpose the U shaped member 63 is provided at one end with a hollow integral boss 72 within which is mounted a sleeve 73, the interior of which is provided at 74 with an ordinary micrometer screw thread to receive a correspondingly threaded extension 75 provided on the shank 14 of the construction shown in Figure 1.

The end of the sleeve 73 which is adjacent to the tubular body 10 is flanged as indicated at 76, the flange being coned and provided with micrometer scale divisions 77 in the known manner for co-operating with a marking line 78 provided on one end of the shank 14, the usual vernier markings being, however, dispensed with.

As will be apparent from the drawing, the end 75 of the shank 14 is hollow, and the gauging member 51 is made of a length rather greater than that of the construction of Figure 1, so that it extends beyond the end of the part 75.

With this form of the invention the scale 42 is constructed as in the form of the invention illustrated in Figure 8, and the operation of the device is essentially similar to that of Figure 8.

In so operating the device it will be understood that the tubular body 10 provides the handle for adjusting the micrometer scale itself, and with the pointer 35 at zero the body 10 is turned until with a whole scale division 77 being read exactly the article whose dimension is to be tested will just pass between the gauging members 64 and 67.

The push button 60 is then actuated to obtain a vernier reading in the manner described in connection with the construction of Figure 8.

What we claim is:

1. A gauge comprising a movable gauging element, which is manually operable, motion magnifying means and indicating means adapted to be operated by said motion magnifying means, means on the movable gauging element normally out of operative engagement with said motion magnifying means but adapted to move into engagement therewith and to actuate same during the period starting when the movable gauging element nearly touches the surface to be gauged until full engagement therewith has been established.

2. A limit gauge comprising a unit having primary and secondary gauging members, said members being movable relatively, means for adjusting said members relatively, an actuating abutment associated with said primary member, primary and secondary levers mounted pivotally on said unit, said primary lever being adapted near its pivot to be engaged by said actuating abutment, a spring adapted to keep said actuating abutment spaced away from said primary lever, said primary movable gauging member being adapted to be operated manually against the pressure of the spring, said primary lever engaging said secondary lever near the pivot of said secondary lever, and indicating means associated with said secondary lever.

3. A gauge comprising a tubular housing, a plate fixedly disposed therein, a slidable gauging rod passing through said housing and having an element disposed in a slot in said plate, pivoted indicator mechanism attached to said plate having a part in close proximity to said element, spring means arranged normally to maintain said element close to but not in operative engagement with said part, and means accessible from the exterior of said housing for adjusting the axial displacement of said rod, the latter having free slidable movement when moved away from the work but adapted to come into engagement with and actuate the said indicator mechanism when the contact end of the rod reaches a predetermined point in its movement toward the work.

SAMUEL WILKINSON.
ARTHUR GREEN.